Jan. 6, 1970

H. GANZ

Re. 26,750

MACHINE AND METHOD FOR PACKAGING ARTICLES

Original Filed June 26, 1958

6 Sheets-Sheet 1

INVENTOR
HENRY GANZ
BY Smyth & Johnston
ATTORNEYS

MACHINE AND METHOD FOR PACKAGING ARTICLES

Original Filed June 26, 1958 6 Sheets-Sheet 2

INVENTOR
HENRY GANZ
BY Pollock, Johnston, Smythe & Robertson
ATTORNEYS

MACHINE AND METHOD FOR PACKAGING ARTICLES

Original Filed June 26, 1958 6 Sheets-Sheet 3

INVENTOR
HENRY GANZ
BY Pollard, Johnston, Smythe & Robertson
ATTORNEYS

MACHINE AND METHOD FOR PACKAGING ARTICLES

Original Filed June 26, 1958 6 Sheets-Sheet 4

INVENTOR
HENRY GANZ
BY
Pollard, Johnston, Smythe & Robertson
ATTORNEYS

MACHINE AND METHOD FOR PACKAGING ARTICLES

Original Filed June 26, 1958 6 Sheets-Sheet 5

INVENTOR
HENRY GANZ
BY
Pollard, Johnston, Smythe & Robertson
ATTORNEYS

MACHINE AND METHOD FOR PACKAGING ARTICLES
Original Filed June 26, 1958 6 Sheets-Sheet 6
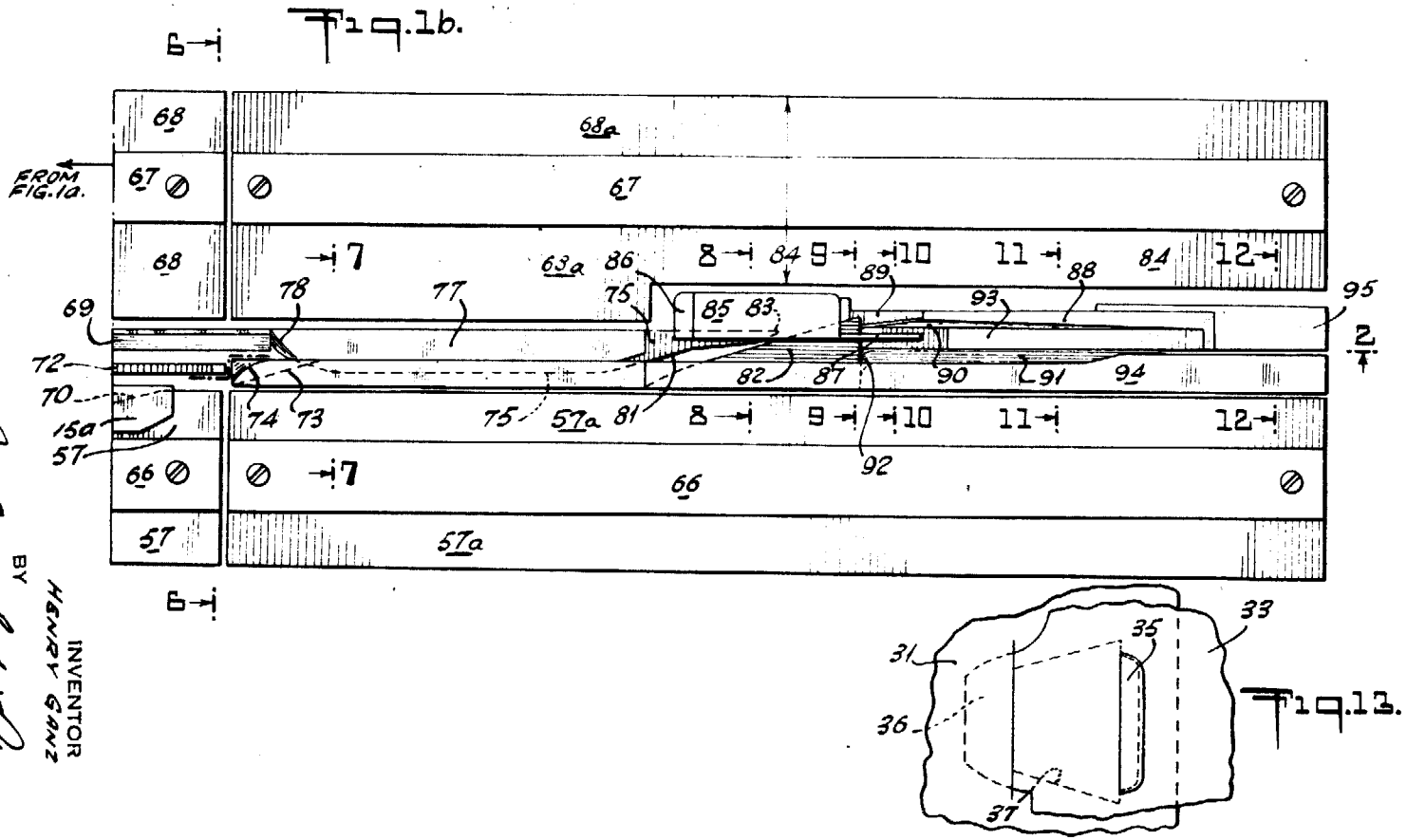
INVENTOR
HENRY GANZ
BY
Pollard, Johnston, Smythe & Robertson
ATTORNEY

United States Patent Office

Re. 26,750
Reissued Jan. 6, 1970

26,750

MACHINE AND METHOD FOR PACKAGING ARTICLES

Henry Ganz, Teaneck, N.J., assignor to Continental Can Company, Inc., New York, N.Y., a corporation of New York Original No. 2,986,857, dated June 6, 1961, Ser. No. 744,634, June 26, 1958. Application for reissue Oct. 24, 1967, Ser. No. 728,865

Int. Cl. B65b *27/04, 35/56;* B31f *7/00*

U.S. Cl. 53—26 33 Claims

Matter enclosed in heavy brackets [ ] appears in the original patent but forms no part of the reissue specification; matter printed in italics indicates the additions made by reissue.

*ABSTRACT OF THE DISCLOSURE*

*This disclosure is directed to a machine for applying to cans a wrap-around carton having side walls terminating at associated closure panels, one of which has a latch opening and the other of which includes a pivotal catch opening a pivot axis for engagement with the latch opening, the machine including means for folding the pivotal catch and for engaging the pivotal catch through the latch opening with the pivot axis disposed between an edge portion of the latch opening and a terminal end of the one panel, and means for swinging the pivotal catch into substantially the plane of the folded closure panels causing the catch to bear against the latch opening edge portion as a fulcrum and draw the pivot axis toward the latch opening edge portion to automatically tighten the side walls against the cans as the closure panels are thereby cammed or levered into full closed overlapped position.*

[The invention relates to the packaging of cans and the like in wrap-around paperboard carriers.]

My invention has special application to use with paperboard cartons of the type disclosed in the copending application of Arthur J. Weiss, Serial No. 748,728, filed July 15, 1958, a continuation-in-part of Serial No. 613,-935, filed February 7, 1958, now abandoned. Such cartons have overlapping closure panels, one of which has a latch opening and the other of which includes a pivotal catch for engagement with such latch opening. In applying such a carton to cans, the closure panels in the completed package are locked together. The catch of one panel is inserted within the latch openings of the other panel, and is then swung so as to lock the catch. The catch may be secured after locking either by a tongue attached to the latching flap or by gluing the latching flap directly, or both.

SUMMARY

In accordance with my invention, such wrap-around paperboard cartons are to be applied around a grouping of cans which are arranged in one or more rows. When packaging two rows of cans and similar containers the chimes of the cans in one row are offset (in the final package) from the chimes of the cans in the adjacent row so as to provide a tight package. As the closure panels of the carton are folded, the chimes of the cans in one row are offset and overlapped, one at a time, with respect to the chimes of the cans in the adjacent row. The pivotal catch must be inserted and locked so as to maintain a tight finished package.

The carton blanks are introduced into the machine in a flat form and are fed onto an upper conveyer which has blocks for pushing the carton blanks. A separating means divides the cans into individual groupings, each of which may contain one or more rows of cans, and delivers the groupings to the entrance of the machine. In the machine herein described, I will refer to the packaging of two rows of cans. The means for feeding the blank and the cans through the machine includes an upper and a lower conveyer. The blocks of the upper conveyer contact both the carton blank trailing edge and the chimes of the two trailing cans in the group being packaged, while the pusher bars of the lower conveyer, which are aligned with the aforementioned blocks, contact the trailing sides of the same cans as they move through the machine; thus, the cans in a grouping and the carton are simultaneously pushed by blocks and a pusher bar. The blank, originally fed onto the upper conveyer, is delivered by the conveyer through curved guides so as to be inverted and then positioned on an incoming grouping of cans.

The means for wrapping the carton blank around the outside of the rows of cans includes a pair of rotating folding discs which are of semicircular form with a flange along a portion of one radial edge. The rotating folding disc causes the flange to contact the side panels of the flat blank that is resting on the can grouping and forces the side panels of the carton blank down along the outsides of the rows of cans.

The means for folding the latch opening panel and for elevating the cans, one at a time, in the row adjacent the latch opening panel includes an idler wheel underlying the path of travel of the approaching cans and having a portion above the plane of the supporting plate along which the cans in that row travel. The latch opening panel passes between the bottom chimes of the said cans and the idler wheel so as to complete the folding of the latch opening panel and elevate the cans, one at a time, thereby placing the chimes of the cans in one row in overlapped relation to the chimes of the cans in the adjacent row as the carton is being wrapped thereabout.

The means for folding the pivotal catch panel and for engaging the pivotal catch includes a folding blade contacting the outside of the panel and a vertical plate parallel to the direction of travel of the cans and aligned with the latch openings. Upon the folding of the panel, the pivotal catches are forced into contact with the vertical plate so as to be aligned with the latch openings. A vertical folding blade with an upwardly tapered edge engages the pivotal catch through the latch opening.

The means for swinging the pivotal catch into substantially the plane of the folded closure panels includes a folding blade which swings the latching flap outwardly. A second folding blade swings the latching flap inwardly so as to direct the tongue against a folding member, which folding member swings the tongue upwardly to pass the tongue through the latch opening while locking the pivotal catch with respect to the latch opening. Instead of securing the pivotal catch by means of the tongue, the latching flap may be glued so as to retain the catch in position.

The idler wheel assists in folding the latching flap beneath the cans as the cans are elevated one at a time. The latching flap is supported on top of the idler wheel between the wheel and the cans. The latching flap assists the elevating motion and cushions the cans while they are being elevated. Since the means for locking the pivotal catch of the carton contains no moving parts, there will be little likelihood of any breakdowns occurring during operation. At the same time, the locking means is suitable for a pivotal catch carton whether the rotary catch is secured by the tongue or by gluing.

Other features and advantages of my invention will appear as the description proceeds.

DESCRIPTION

In the drawings I have illustrated a machine to show the best mode contemplated by me of carrying out my invention as applied to the packaging of two rows of cans in a wraparound carton having a rotary catch.

FIGS. 1A and 1B, when positioned together at the indicated dash lines, give a plan view of the machine.

FIG. 13 is an enlarged view of the pivotal catch being swung into the plane of the closure panels.

Figure 1:
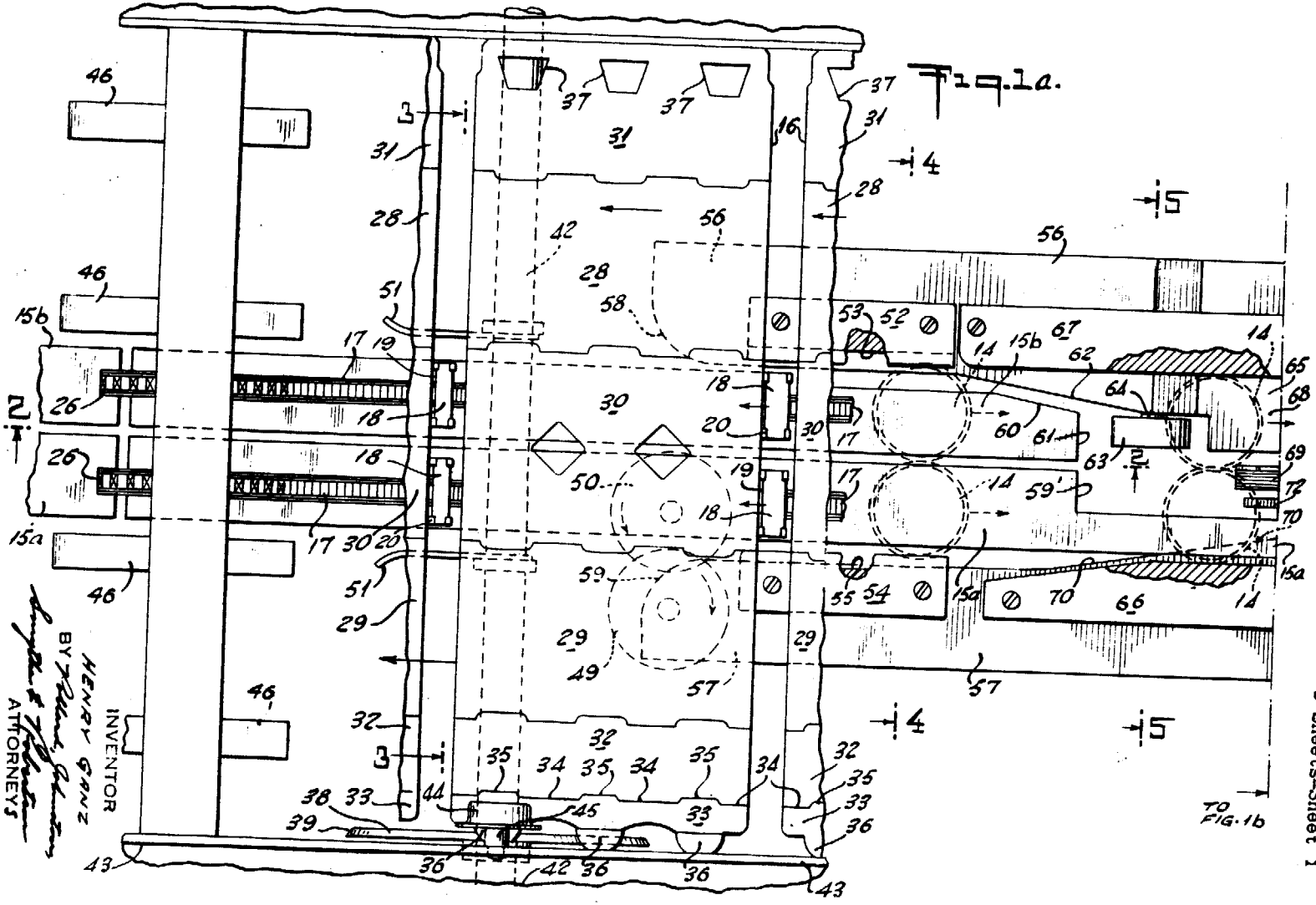

In FIGS. 1A and 1B, the flow of the cans 14 through the machine is from the left to the right. The cans 14 enter the machine along support plates 15a and 15b. The cans 14 which are to be packaged have been separated into groups of six by a group selector means (not shown) as disclosed in my copending application, Serial No. 677,387, filed August 9, 1957, now abandoned. In FIG. 1A, the carton blanks 16 are moved by pusher blocks 18 carried by conveyor chains 17. FIG. 1A shows the blank 16 resting on the conveyor chains 17 and travelling in a leftward direction above the incoming cans. The blocks 18 contain recess 19 and projections 20, which projections serve to push the carton blanks forward along the upper reach of the upper conveyor 21 shown in an elevation view in FIG. 2. Such blocks are disclosed in more detail in my above-referred to copending application.

Figure 2:
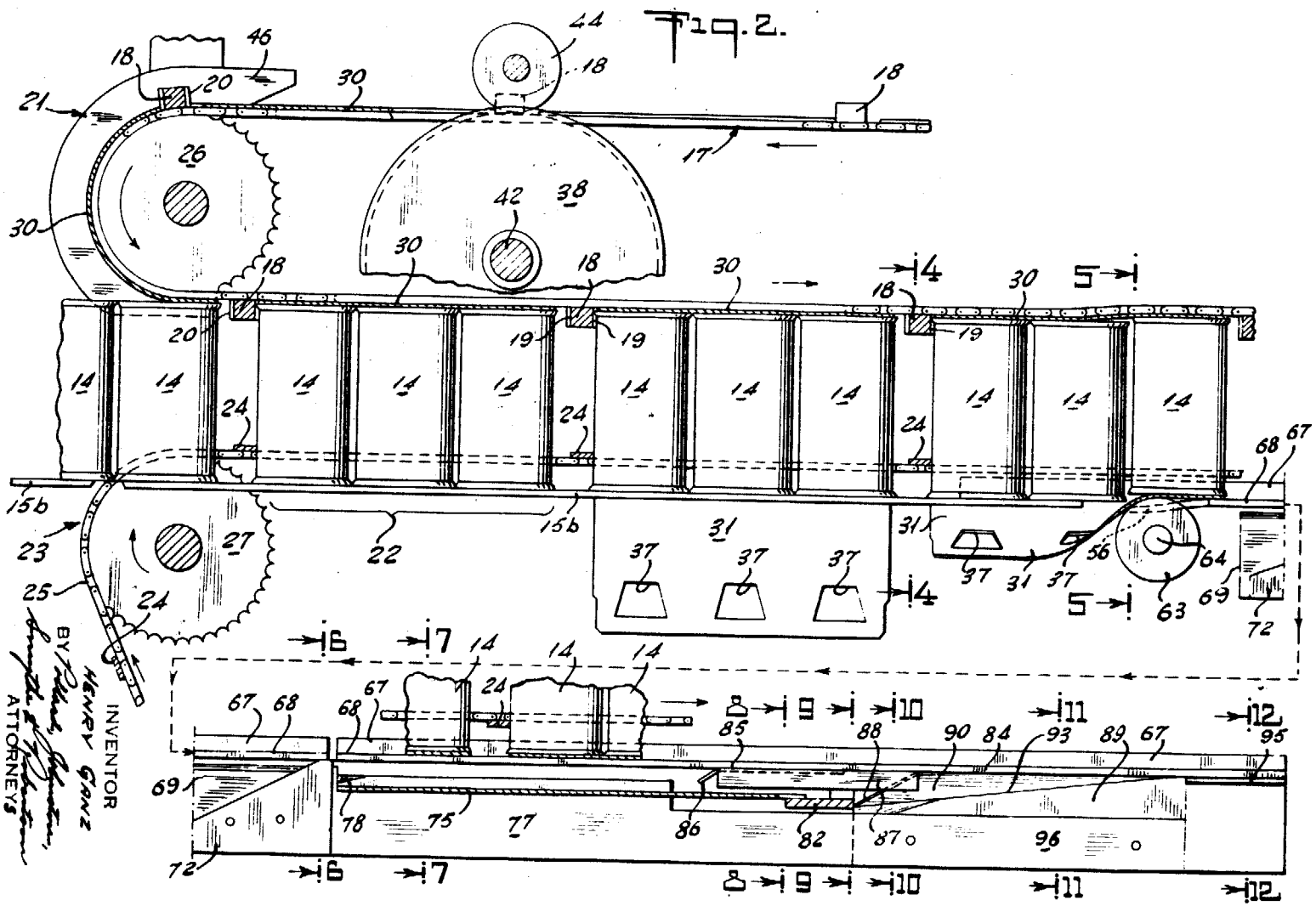
FIG. 2 is a front elevation view of the machine with the right portion of the machine shown at the bottom of the drawing.

The can groupings 22, each of which include two rows, are delivered along supports 15a and 15b by the separating means in a synchronized relationship with both upper conveyor 21 above the can grouping and is contacted by ing is pushed by the blocks 18 on conveyor chain 17 and the pusher bars 24 on the lower conveyor chain 25. In FIG. 2, the pusher bars 24 rest against the trailing sides of the two end cans of a can grouping 22. The recess 19 of the blocks 18 contact the chimes of the end cans 14 while projections 20 contact the trailing edge of the carton blank 16. Thus, the can grouping 22 is pushed by the recessed portion of the blocks 18 and by the pusher bars 24 while the carton blank 16 is conveyed by conveyer 21 above the can goruping and is contacted by the projections 20 which also push the blank along. Sprocket wheels 26 and 27, powered by conventional means (not shown), drive the conveyer chains in the direction of the arrows in FIG. 2. The chains are synchronized so as to maintain alignment between blocks 18 and pusher bars 24.

FIG. 1A shows a plan view of the complete carton blank in an unfolded state resting on the conveyer chains 17. The carton blank is disclosed in the aforesaid copending application of Arthur J. Weiss. The carton blank includes side panels 28 and 29, top panel 30, and bottom closure panels 31 and 32. Closure panel 32 has a latching flap 33, pivotal *primary latching members or* catches 35 along the fold line 34 of latching flap 33, and *secondary latching members or* tongues 36 attached to latching flap 33. Latch openings 37 are located on closure panel 31. Fold lines are provided between the various panels.

Figure 3:
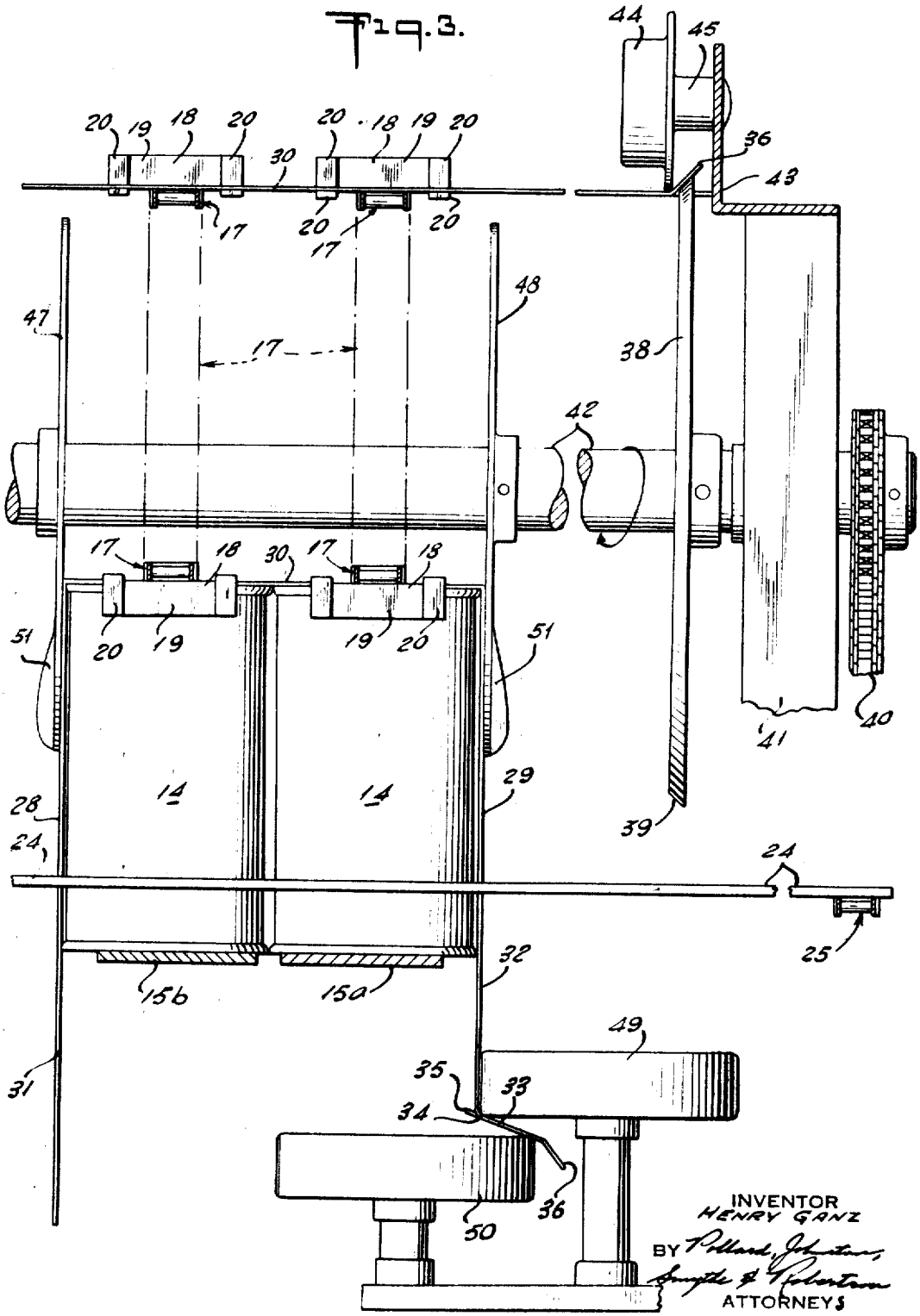
FIG. 3 is an enlarged side elevational view of the machine, illustrating the carton side panel folding operation.

The carton blanks 16 are delivered onto conveyer chains 17 by a feeding means (not shown) such as that disclosed in my copending application, Serial No. 677,387. As shown in FIG. 3, folding disc 38, having a conical rim 39, is driven by chain 40 through shaft 42. Shaft 42 is supported in a bearing carried by support 41 and rotates once for each passing can grouping so that the flange in its rotation comes into contact with each passing blank. Said support carries a bracket 43 for supporting shaft 45 upon which is mounted idler disc 44. Disc 44 is slightly offset from rim 39 so that tongue 36 may pass therebetween and thereby be folded in an upward manner thus pre-breaking the score line between tongue 36 and flap 33.

Figure 7:
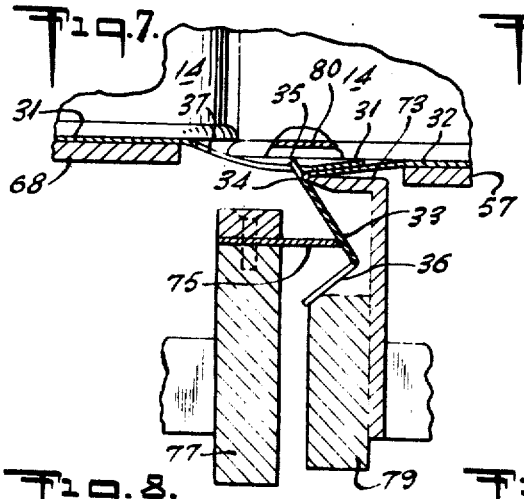
FIG. 7 is an enlarged sectional view taken along the line 7—7 of FIG. 1B, illustrating the initial rotation of the latching flap.

This pre-breaking is of great importance in high-speed automatic machinery in which upwards of 720 cans are packaged in a minute. The pre-breaking insures smooth bending of the tongues 36 between folding members 75, 79 of FIG. 7.

In machines of less speed such as those packaging 300 cans, more or less, per minute the need for such pre-breaking is not as great as the carton goes through much more slowly.

The same situation exists in connection with the pre-breaking of the score line between flaps 32, 33 and for the same reasons.

The carton blanks then pass within curved guides 46 which conform to the circular travel of chain 17 around wheels 26. From the guides 46, the carton blanks 16 are placed upon the incoming can groupings 22. Each grouping, with the carton blank thereon, is then pushed along supports 15a and 15b until it is beneath folding discs 47, 48. As shown in FIGS. 2 and 3, discs 47, 48 are semi-circular in form and are provided with flanges 51 which come into contact with the carton blank 16 resting on the approaching groupings 22. Flanges 51 start the downward folding of side panels 28 and 29 of carton blank 16. Discs 47, 48 are also driven by shaft 42 so that its rotation is synchronized with the speed of travel of can groupings 22. As further shown in FIG. 3, latching flap 33 is folded upwardly along fold line 34 by the action of offset wheels 49 and 50. Plates 56 and 57 contain curved end portions 58 and 59, respectively, so as to facilitate the entrance of the folded down sides of the carton between guides 52 and 54.

Figure 4:
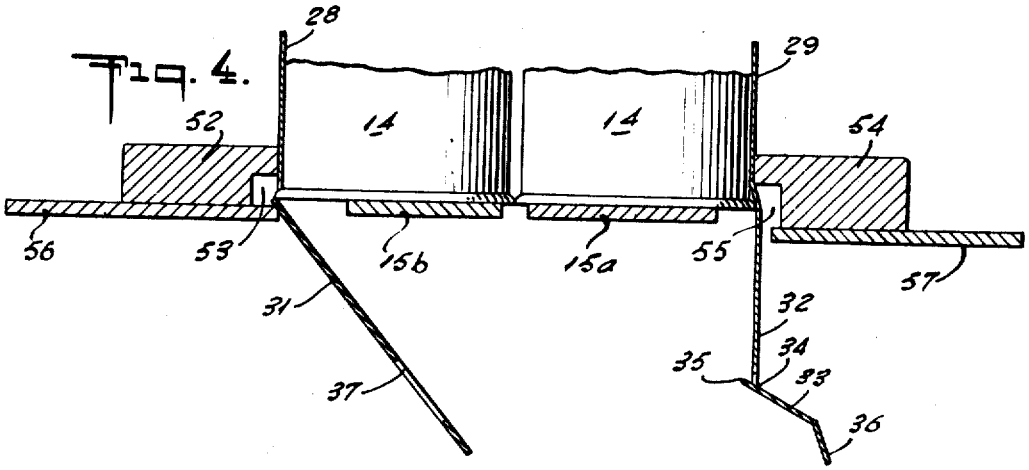
FIG. 4 is an enlarged sectional view taken along the lines indicated in FIG. 1A, illustrating the beginning of the latch opening panel folding operation.

As shown in FIG. 4, guide 52, which has an undercut 53, is mounted with its inner edge overhanging that of folding plate 56. The inside surface of guide 54 overhangs the inside edge of folding plate 57. Undercuts 53 and 55 permit movement of that portion of flaps 31, 32 that extend beyond the sides 28, 29 when said flaps 31, 32 are being folded into horizontal position. The folding plates 56, 57, as the blank is slid along them, cause said flaps to fold towards its final horizontal position.

As shown in FIG. 1A, support plate 15A is cut out at 59, so as to provide clearance for flap 33 when it is folded upwardly. Support plate 15B is cut inwardly at 60 near its end 61 and support plate 56 also has a portion 62 extending inwardly, spaced from but substantially parallel to the portion 60 of plate 61.

Figure 5:
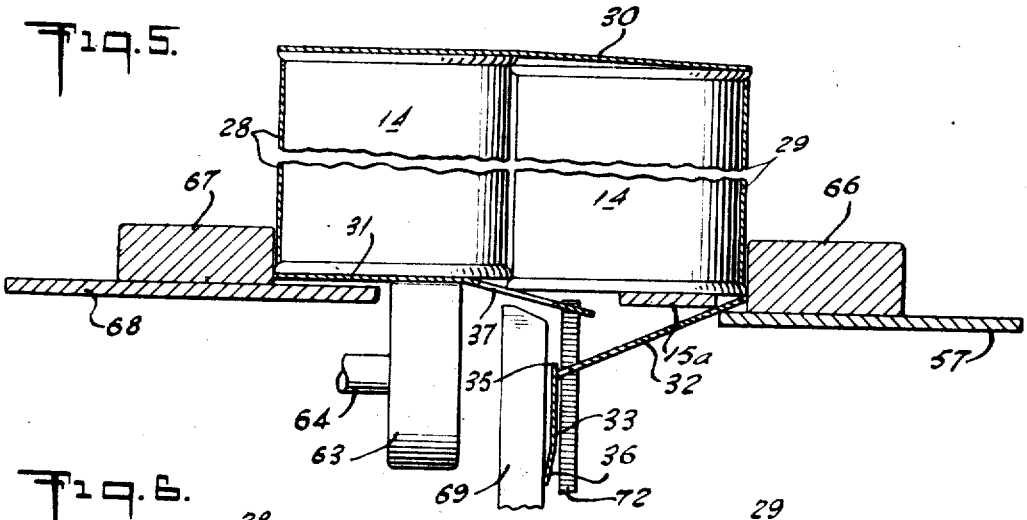
FIG. 5 is an enlarged sectional view taken along the lines indicated in FIG. 1A, illustrating the completion of the latch opening panel folding operation, the elevation of the cans and the beginning of the pivotal catch panel folding operation.
Figure 6:
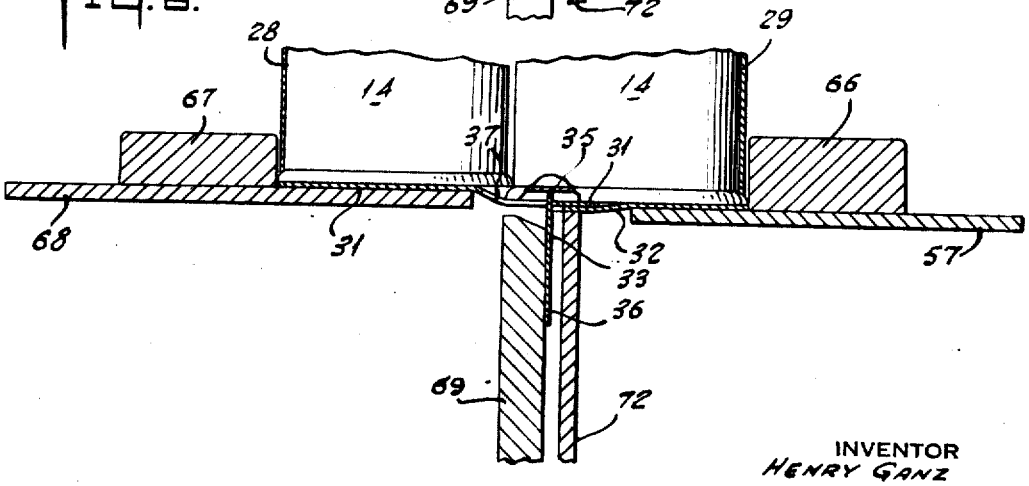
FIG. 6 is an enlarged sectional view taken along the line 6—6 of FIG. 1B, illustrating the engagement of the pivotal catch.

As illustrated best in FIG. 5, an idler wheel 63 carried on shaft 64 is located in line with support plate 15B beyond end 61. The upper portion of the rim of idler wheel 63 is above the plane of support plates 15A and 15B, so that, as the grouping 22 approaches portion 62, carton panel 31 is deflected upwardly. The carton panel 31, as the carton continues its forward movement, then comes into contact with the rim of wheel 63 and is forced upward between the rim of said wheel and the bottom chimes of the advancing cans.

The elevation of the cans 14 of one row, one at a time, by idler wheel 63 serves to offset the chimes of the cans in the row passing over the idler with respect to the chimes of the cans of the adjacent row. During this offsetting action, as shown in FIG. 5, the convergent portion of guide 66 causes the cans in one row to move in a lateral direction, one at a time, towards the cans in the adjacent row thus causing the chimes of the cans in one row to overlap the chimes of the cans in the other row. By folding closure panel 31 under plate 15B as the row of cans 14 on plate 15B approaches idler 63, the cans are smoothly transferred from support plate 15B and are cushioned during the elevating action. As also shown in FIG. 5, support plate 68 at a point beyond the idler 63 is elevated above support plate 57 so as to maintain the package in a vertical position after its passes beyond idler wheel 63.

After leaving wheel 63, closure panel 31, which has been completely folded up against the bottoms of the cans, passes above vertical plate 69. The tapered portion 70 of plate 57 serves as a folding blade which rotates closure panel 32 upwardly beneath the narrow portion of support plate 15B. Upon the continued upward movement of closure panel 32, tongues 36 and latching flap 33 are forced against vertical plate 69. Folding blade 72 is spaced from and parallel with vertical plate 69 and is tapered upwardly in the direction of travel of the cans through the machine. The advancing edge of closure panel 32 contacts the tapered portion of folding blade 72 and is urged upwardly as the cans move along with the plate 15A beneath one row of cans and with the adjacent row resting on panel 31. As the top of the tapered portion of folding blade 72 is reached, closure panel 31 and closure panel 32 are forced into complete folding and overlapping while pivotal catch 35, which is guided by vertical plate 69, is directed through latch opening 37 in closure panel 31. At this point, pivotal catch 35, latching flap 33 and tongue 36 are at substantially right angles to the bottoms of the cans. It should also be noted that the carton closure panels have now been completely folded and overlapped with support plate 15A still in the package before the cans leave their supports as the package travels onto receiving plates 57A and 68A. As the package travels onto receiving plates 68A, 57A the support plate 15A is no longer in the package.

An angled folding member 73A having a horizontal folding section or blade 73 (FIG. 7) is located adjacent and parallel to support plate 57A, and has a rounded end portion 74 (FIG. 1B) which assists the passage of the folded latching flap and closure panel. At this point, the fold line of the latching flap 33 is in contact with the edge of folding blade 73. The underside of the outer edge of blade 73 is tapered so as to give clearance for panel 33 in its backward movement. Lower horizontal folding blade 75, mounted on support 77, is positioned so as to underlie and be substantially parallel to folding blade 73. As the carton advances, the forward edge of latching flap 33 comes in contact with the rounded end portion 78 (see FIG. 1B) of lower folding blade 75. As the carton travels along and in contact with this blade it rotates latching flap 33, so as to swing the pivotal catch about fold line 34 around the edge of folding blade 73 which serves as a fulcrum. This action results in tongue 36 being deflected against vertical support 79. Due to the fact that the top surface of folding blade 73 is located lower than the top surface of plate 57, pivotal catch 35 will clear the bottom 80 of the can as it is swung outwardly. However, many times the bottoms of some cans are bulged outwardly to a greater extent than some others. In such a case, the carrier is strong enough so that the swinging motion of catch 35 can continue provided there is a give in the flap 31. The fact that blade 73 is positioned below blade 57, as heretofore explained, allows for the bending down of flap 31 when latch 35 is forced to move up and down due to the irregular surface of the bottoms of the cans or other containers being packaged. This outward bulging into convex form is usually caused by the internal pressure of the contents of cans containing beer. With pivotal catch 35 moved down so as to clear bottom 80, it is then in a position to be moved into interlocking engagement with latch opening 37.

Figure 10:
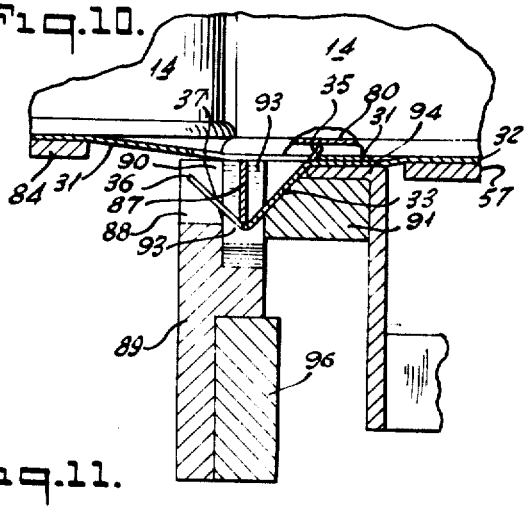
FIG. 10 is an enlarged sectional view taken along the line 10—10 of FIG. 1B, illustrating further swinging of the pivotal catch.
Figure 8:
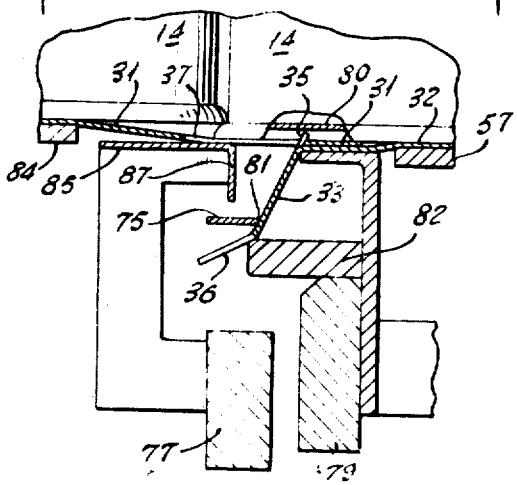
FIG. 8 is an enlarged sectional view taken along the line 8—8 of FIG. 1B illustrating the swinging of the pivotal catch in the opposite direction.
Figure 11:
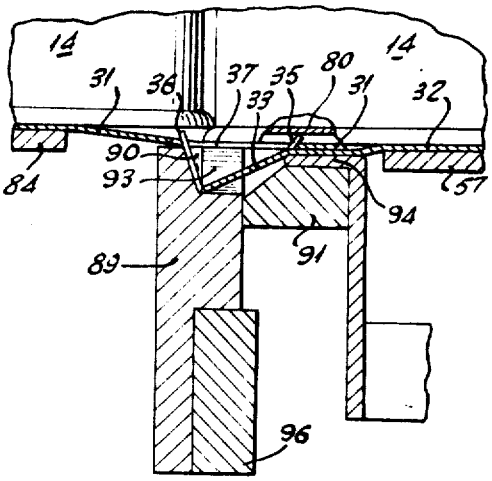
FIG. 11 is an enlarged sectional view taken along the line 11—11 of FIG. 1B, illustrating the tongue inserting operation.
Figure 9:
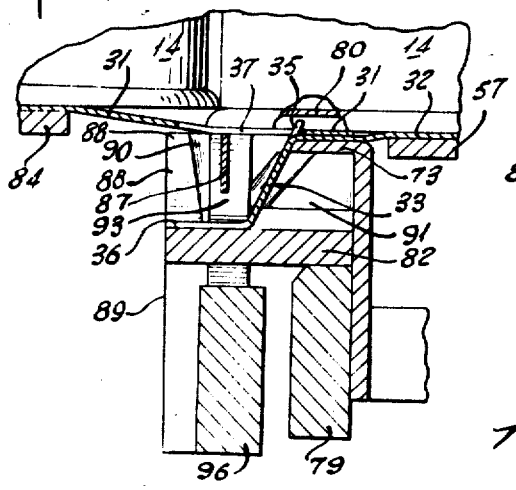
FIG. 9 is an enlarged sectional view taken along the line 9—9 of FIG. 1B, illustrating the beginning of the tongue folding operation.
Figure 12:
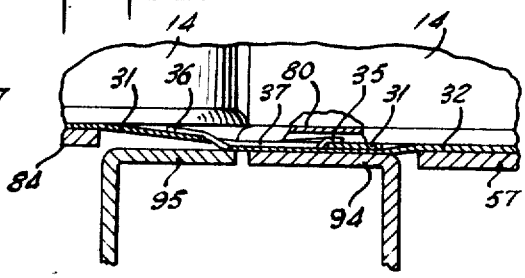
FIG. 12 is an enlarged sectional view taken along the line 12—12 of FIG. 1B, illustrating the pivotal catch.

As shown in FIG. 1B, lower folding blade 75 has a portion 81 which tapers toward support plate 68. Slightly beyond the beginning of this tapered portion 81 is the beginning of tapered folding bar 82, which lies in a horizontal plane and rests upon vertical support 79. The advanced edge of latching flap 33 comes in contact with tapered folding bar 82, which causes latching flap 33 to rotate inwardly. Continued inward rotation causes pivotal catch 35 to move into the latch opening 37. As seen in FIG. 8, folding bar 82 urges latching flap 33 against the end portion 83 (FIG. 1B) of lower horizontal folding blade 75, located above folding bar 82. As seen in FIGS. 1B and 9, folding bar 82 tapers inwardly sufficiently so that folded tongue 36 passes over it when it is beyond end 83 of horizontal folding blade 75. Support 85 is positioned at the beginning of a narrow portion 84 of support plate 68. Support 85 has a ramp 86 (FIG. 1B) which permits the smooth passage of closure panel 31 as it travels onto support 85. Vertical guide 87 is attached to the inner edge of support 85. Originating at the end of folding bar 82 is the ramp portion 88 of wall 89, mounted on support 96, the inner surface of wall 89 having a sloping contour 90. Sloping guide wall 91 has a rounded end portion 92. As the carton advances, tongue 36 passes from folding bar 82 to ramp portion 88 of wall 89, which, as shown in FIGS. 9 and 10, folds tongue 36 toward vertical guide 87. The upward folding of tongue 36 causes the upward rotation of latching flap 33 so that it passes over rounded end portion 92 and onto sloping guide wall 91. During these movements, pivotal catch 35 passes beneath the can bottom 80 so as to lock against latch opening 37. Ramp 93, which lies between wall 89 and guide wall 91, slopes in an upward direction. Tongue 36 passes from ramp portion 88 to sloping contour 90 of wall 89, at which time it is aligned with latch opening 37, and then the fold line connecting tongue 36 to latching flap 33 contacts ramp 93. As the fold line of tongue 36 progresses upwardly along ramp 93, tongue 36 is passed through the latch opening and beneath the can bottom. Widened portion 94 of folding blade 73 aids the final locking motion by pushing against latching flap 33. Support plate 95, located at the end of ramp 93, also contacts latching flap 33 so as to flatten the closure panels against the can bottoms.

OPERATION

As a further aid to the understanding of my invention, I shall now describe the preferred sequence of operating steps.

Can groupings 22 are delivered to the machine by a group selector mechanism (not shown) while carton blanks 16 are delivered to the upper conveyer 21. The upper conveyer 21 is synchronized with the group selector mechanism for the can groupings 22 so that the carton blanks are inverted and then placed upon the can groupings after the passage of said blanks through curved guides 46. Can groupings 22 are pushed through the machine by means of blocks 18 and pusher bars 24 carried upon upper chain 17 and lower chain 25, respectively. The interaction of discs 38 and 44 serves to break the fold line between tongues 36 and flaps 33 of carton blank 16 while wheels 49 and 50 serve to break the fold line 34 between latching flap 33 and panel 32. Carton side panels 28 and 29 are then folded along the sides of the can grouping 22 by means of discs 47, 48. Tapered portion 62 of the folding support plate 56 initiates the upward turning of closure panel 31 which then passes between the bottoms of the chimes of the cans and idler 63. Idler wheel 63 both helps to fold closure panel 31 beneath the cans and elevates the cans, one at a time in one row, so that the chimes of the cans in one row are offset with respect to those in the adjacent row. Convergent guide 66 urges the adjacent row of cans, also one at a time, towards the row being elevated so as to overlap the offset chimes. The folding of the closure panel 31 beneath the cans approaching idler 63 facilitates a smooth entry of the cans for elevation by idler 63, while idler 63 supports the panel 31 with the weight of the cans thereon.

After leaving idler wheel 63 the cans which formerly were in contact with support plate 15B are now resting on closure panel 31 which is now supported by plate 68.

The action of the tapered portion 70 of support plate 57 and the tapered folding blade 72 serves to swing closure panel 32 beneath the support 15A upon which one row of cans is resting. At the same time, vertical plate 69 and plate 72 direct tongues 36 through latch openings 37. At this point, closure panel 32 has been completely folded and completely overlaps panel 31 and has passed beyond the end of support plate 15A so that it also is now in contact with the bottoms of the chimes in the adjacent row.

To insure clearance between pivotal catch 35 and the bottoms 80 of the cans within the area inside of the can chimes, horizontal folding blade 75 rotates latching flap 33 with respect to the horizontal folding section blade 73, of the angled folding member 73A. Member 73 serves as a fulcrum for the folding action. Tapered folding bar 82 then swings latching flap 33 in the opposite direction to start the locking motion, which locking motion is continued by ramp portion 88 of wall 89 urging tongue 36 in an upward manner so that the fold line of tongue 36 passes around vertical guide 87. Sloping guide wall 91 supports latching flap 33 during the folding of tongues 36.

Upward sloping ramp 93, acting on the fold line of tongue 36, pushes the tongue through latch opening 37. The final closing of latching flap 33 is accomplished by widened portion 94 of folding blade 73, while support 96 flattens latching flap 33 against the bottom chimes.

The above folding and locking of the panels 31 and 32 is accomplished by the continuous forward movement of the blank and cans so that the panels 31, 32 come into contact sequentially with the various folding and locking members above described as the blank and cans travel through the machine, thus causing the panels 31, 32 to move in the manner heretofore stated.

The terms and expressions which I have employed are used in a descriptive and not a limiting sense, and I have no intention of excluding such equivalents of the invention described, or of portions thereof, as fall within the purview of the claims.

I claim:

1. In a machine for applying to cans and the like arranged in rows, a wrap-around carton having overlapped closure panels one of which has a latch opening and the other of which includes a pivotal catch for engagement with said latch opening, means for pushing the carton blank and cans through the machine, means for wrapping the carton blank around the outside of the rows of cans, means for folding said latch opening panel beneath the cans and for simultaneously elevating the cans, one at a time, beneath which said latch opening panel is being folded and in the row adjacent said latch opening panel to place the chimes of said cans in overlapped relation to the chimes of the cans in the adjacent row, means for simultaneously folding the pivotal catch panel beneath the cans in the row adjacent said pivotal catch panel, means for engaging the pivotal catch through said latch opening, and means for swinging the pivotal catch into substantially the plane of the folded closure panels.

2. A machine in accordance with claim 1, wherein said carton blank has side panels which when the carton blank is wrapped around the cans, contact the sides of the cans, and further comprising means for moving and holding the rows together, said last named means including a pair of guides each of which contact one of said side panels, said guides having portions which converge in the direction of travel of said cans and end substantially adjacent said elevating means, portions substantially parallel to each other in advance of said elevating means and said converging portions, and other portions parallel to each other beyond said converging portions.

3. In a machine for applying to rows of cans and the like a wrap-around carton having overlapping closure panels, supports along which said cans travel, means for wrapping the carton blank around the outside of said cans, means for securing said panels to each other and means including an idler roller underlying and having its axis of rotation at substantially a right angle to the path of travel of said row of cans adjacent said latch opening panel and having a portion thereof raised above the plane of the support along which said cans travel said portion of said roller being substantially tangential to the bottoms of the cans so as to elevate the cans in one row, one at a time, above the cans in an adjacent row.

4. In a machine for applying to cans and the like arranged in rows, a wrap-around carton having *side walls each terminating at an associated closure panel, one of said* closure panels [one of which] has a latch opening and the other of *said closure panels* [which] includes a pivotal catch *having a pivot axis* for engagement with said latch opening, the combination comprising *means for pushing the carton blank and cans through the machine,* means for folding the pivotal catch panel and for engaging the pivotal catch panel through said latch opening *with said pivot axis positioned between an edge portion of said latch opening and a terminal end of said one panel,* and means for swinging the pivotal catch into substantially the plane of the folded closure panels *causing said catch to bear against said latch opening edge portion as a fulcrum and draw said pivot axis toward said latch opening edge portion to automatically tighten the side walls against the contents as the closure panels are thereby cammed or levered into fully closed overlapped position.*

5. A machine in accordance with claim 4 in which said means for folding the pivotal catch and for engaging the pivotal catch includes a folding blade contacting the outside of said panel, a vertical plate parallel to the direction of travel of said cans and aligned with said latch opening, and a vertical folding blade having an upwardly tapered top edge, said vertical folding blade being located between said vertical plate and said folding blade in parallel relationship to said vertical plate and spaced therefrom so that the rotary catch moves towards said latch opening while said tapered edge contacts the outside of said panel.

6. A machine in accordance with claim 4 wherein said pivotal catch panel includes a latching flap extending along the end of said panel at a transverse fold line located within the overlap of said closure panels, said pivotal catch extending across and interrupting said fold line, and a tongue projecting from the end of said latching flap, said catch and said tongue extending in opposite directions, in which said means for swinging the pivotal catch includes an upper horizontal blade located beneath the chimes of said cans with its inner edge lying along the outside of said fold line, a folding blade for swinging said latching flap inwardly, a substantially vertical plate parallel to blade, a second folding blade for swinging said latching flap inwardly, a substantailly vertical plate parallel to the direction of travel of the cans and above the path of travel of said tongue, a folding member for swinging the tongue upwardly about said vertical plate as a fulcrum so as to align said tongue with the latch opening, and a ramp sloping upwardly in the direction of travel of the cans for pushing the end of the latching flap thereby to pass the tongue through the latch opening and complete the upward swing of the latching flap.

7. The method of applying to cans and the like arranged in rows, a wrap-around carton having overlapped closure panels one of which has a latch opening and the other of which includes a pivotal catch for engagement with said latch opening, which comprises the steps of wrapping the carton blank around the outside of the rows of cans, folding the latch opening panel beneath the cans and at the same time elevating the cans beneath which the latch opening flap is being folded, one at a time, in the row adjacent said latch opening panel, moving the cans in the adjacent row laterally, one at a time, to place the chimes of said cans in overlapped relation to the chimes of the cans in the said adjacent row, then folding the pivotal catch panel beneath the cans in the row adjacent said pivotal catch panel, engaging the pivotal catch through said latch opening, and swinging the pivotal catch into substantially the plane of the folded closure panels.

8. In the method of applying to cans and the like arranged in rows, a wrap-around carton having overlapped closure panels one of which has a latch opening and the other of which has a pivotal catch for engagement with said latch opening, the steps performed concurrently of *pushing the carton blank and cans along a predetermined path,* folding the latch opening panel beneath the cans and continuing the folding of said latch opening panel after it contacts the cans to transmit a lifting force to the cans to elevate the cans beneath which said latch opening panel is being folded, one at a time, in the row adjacent said latch opening panel to place the chimes of said cans in overlapped relation to the chimes of the cans in the adjacent row.

9. In a machine for applying to cans and the like arranged in rows, a wrap-around carton blank having overlapped closure panels one of which has a latch opening and the other of which includes a pivotal catch for engagement with said latch opening, means for pushing the carton blank and cans through the machine, means for wrapping the carton blank around the outside of the rows of cans; means for folding the latch opening panel beneath the cans and for simultaneously elevating the cans, one at a time, in the row adjacent said latch opening panel to place the chimes of said cans in overlapped relation to the chimes of the cans in the adjacent row, including an idler wheel underlying and having its axis of rotation at substantially a right angle to the path of travel of said row of cans adjacent said latch opening panel and having a portion of said wheel extending above the plane of the support along which the cans travel, said portion of said wheel being substantially tangential to the bottoms of the cans; means for folding the pivotal catch panel beneath the cans in the row adjacent said pivotal catch panel; means for engaging the pivotal catch through said latch opening; and means for swinging the pivotal catch into substantially the plane of the folded closure panel.

10. In a machine for applying to cans and the like arranged in rows, a wrap-around carton blank having overlapped closure panels one of which has a latch opening and the other of which includes a pivotal catch for engagement with said latch opening, means for pushing the carton blank and cans through the machine; means for wrapping the carton blank around the outside of the rows of cans; means for folding the latch opening panel beneath the cans and for simultaneously elevating the cans, one at a time, in the row adjacent said latch opening panel to place the chimes of said cans in overlapped relation to the chimes of the cans in the adjacent row; means for folding the pivotal catch panel beneath the cans in the row adjacent said pivotal catch panel; means for engaging the pivotal catch through said latch opening; said means for folding the pivotal catch panel and said means for engaging the pivotal catch including a folding blade contacting the outside of said panel, a vertical plate parallel to the direction of travel of said cans and aligned with said latch opening, and a vertical folding blade having an upwardly tapered top edge, said vertical folding blade being located between said vertical plate and said folding blade in parallel relationship to said vertical plate and spaced therefrom so that the pivotal catch passes upwards between said vertical plate and said latch opening while said tapered edge contacts the outside of said panel; and means for swinging the pivotal catch into substantially the plane of the folded closure panels.

11. In a machine for applying to cans and the like arranged in rows, a wrap-around carton blank having overlapped closure panels one of which has a latch opening and the other of which includes a pivotal catch for engagement with said latch opening, said pivotal catch panel including a latching flap extending along the end of said panel at a transverse fold line located within the overlap of said closure panels, said pivotal catch extending across and interrupting said fold line, and a tongue projecting from the end of said latching flap, said catch and said tongue extending in opposite directions, means for pushing the carton blank and cans through the machine, means for wrapping the carton blank around the outside of the rows of cans, means for folding the latch opening panel beneath the cans and for simultaneously elevating the cans, one at a time, in the row adjacent said latch opening panel to place the chimes of said cans in overlapped relation to the chimes of the cans in the adjacent row, means for folding the pivotal catch panel beneath the cans in the row adjacent said pivotal catch panel, means for engaging the pivotal catch through said latch opening, and means for swinging the pivotal catch into substantially the plane of the folding closure panels including an upper horizontal blade located beneath the chimes of said cans with its inner edge lying along the outside of said fold line, a folding blade for swinging said latching flap outwardly with respect to said upper horizontal blade, a second folding blade for swinging said latching flap inwardly, a substantially vertical plate parallel to the direction of travel of the cans and above the path of travel of said tongue, a folding member for swinging the tongue upwardly about said vertical plate as a fulcrum so as to align said tongue with the latch opening, and a ramp sloping upwardly in the direction of travel of the cans for pushing the end of the latching flap thereby to pass the tongue through the latch opening.

12. In a machine for applying to cans and the like arranged in rows, a wrap-around carton blank having overlapped closure panels one of which has a latch opening and the other of which includes a pivotal catch for engagement with said latch opening, said pivotal catch panel including a latching flap extending along the end of said panel at a transverse fold line located within the overlap of said closure panels, said pivotal catch extending across and interrupting said fold line, means for pushing the carton blank and cans through the machine, means for wrapping the carton blank around the outside of the rows of cans, means for folding the latch opening panel beneath the cans and for simultaneously elevating the cans, one at a time, in the row adjacent said latch opening panel to place the chimes of said cans in overlapped relation to the chimes of the cans in the adjacent row, means for folding the pivotal catch panel beneath the cans in the row adjacent said pivotal catch panel, means for engaging the pivotal catch panel through said latch opening, and means for swinging the pivotal catch into substantially the plane of the folded closure panels including an upper horizontal blade located beneath the chimes of said cans with its inner edge lying along the outside of said fold line, a folding blade swinging said latching flap outwardly with respect to said upper horizontal blade, and a second folding blade for swinging said latching flap inwardly into substantially the plane of the folded closure panels.

13. In a machine for applying to cans and the like arranged in rows, a wrap-around carton blank having overlapped closure panels one of which has a latch opening and the other of which includes a pivotal catch for engagement with said latch opening, said pivotal catch panel including a latching flap, extending along the end of said panel at a transverse fold line located within the overlap of said closure panels, said pivotal catch extending across and interrupting said fold line, a tongue projecting from the end of said latching flap, said catch and said tongue extending in the opposite direction and an additional transverse fold line extending between said tongue and said latching flap, means for breaking said transverse fold line and other means for breaking said additional transverse fold line, means for pushing the carton blank and cans through the machine, means for wrapping the carton blank around the outside of the rows of cans, means for folding the latch opening panel beneath the cans and for simultaneously elevating the cans, one at a time, in the row adjacent said latch opening panel to place the chimes of said cans in overlapped relation to the chimes of the cans in the adjacent row, means for folding the pivotal catch panel beneath the cans in the row adjacent said pivotal catch panel, means for engaging the pivotal catch through said latch opening, and means for swinging the pivotal catch into substantially the plane of the folding closure panels including an upper horizontal blade located beneath the chimes of said cans with its inner edge lying along the outside of said fold line, a folding blade for swinging said latching flap outwardly with respect to said upper horizontal blade, a second folding blade for swinging said latching flap inwardly, a substantially vertical plate parallel to the direction of travel of the cans and above the path of travel of said tongue, a folding member for swinging the tongue upwardly about said vertical plate as a fulcrum so as to align said tongue with the latch opening, and a ramp sloping upwardly in the direction of travel of the cans for pushing the end of the latching flap thereby to pass the tongue through the latch opening.

14. In a machine for applying to cans and the like arranged in rows, a wrap-around carton blank having overlapped closure panels one of which has a latch opening and the other of which includes a pivotal catch for engagement with said latch opening, said pivotal catch panel including a latching flap, extending along the end of said panel at a transverse fold line located within the overlap of said closure panels, said pivotal catch extending across and interrupting said fold line, a tongue projecting from the end of said latching flap, said catch and said tongue extending in the opposite direction and an additional transverse fold line extending between said tongue and said latching flap, means for breaking said transverse fold line, means for pushing the carton blank and cans through the machine, means for wrapping the carton blank around the outside of the rows of cans, means for folding the latch opening panel beneath the cans and for simultaneously elevating the cans, one at a time, in the row adjacent said latch opening panel to place the chimes of said cans in overlapped relation to the chimes of the cans in the adjacent row, means for folding the pivotal catch panel beneath the cans in the row adjacent said pivotal catch panel means for engaging the pivotal catch through said latch opening, and means for swinging the pivotal catch into substantially the plane of the folding closure panels including an upper horizontal blade located beneath the chimes of said cans with its inner edge lying along the outside of said fold line, a folding blade for swinging said latching flap outwardly with respect to said upper horizontal blade, a second folding blade for swinging said latching flap inwardly, a substantially vertical plate parallel to the direction of travel of the cans and above the path of travel of said tongue, a folding member for swinging the tongue upwardly about said vertical plate as a fulcrum so as to align said tongue with the latch opening, and a ramp sloping upwardly in the direction of travel of the cans for pushing the end of the latching flap thereby to pass the tongue through the latch opening.

15. In a machine for applying to cans and the like arranged in rows, a wrap-around carton blank having overlapped closure panels one of which has a latch opening and the other of which includes a pivotal catch for engagement with said latch opening, said pivotal catch panel including a latching flap, extending along the end of said panel at a transverse fold line located within the overlap of said closure panels, said pivotal catch extending across and interrupting said fold line, a tongue projecting from the end of said latching flap, said catch and said tongue extending in the opposite direction and an additional transverse fold line extending between said tongue and said latching flap, means for breaking said additional transverse fold line, means for pushing the carton blanks and cans through the machine, means for folding the latch opening panel beneath the cans and for simultaneously elevating the cans, one at a time, in the row adjacent said latch opening panel to place the chimes of said cans in overlapped relation to the chimes of the cans in the adjacent row, means for folding the pivotal catch panel beneath the cans in the row adjacent said pivotal catch panel, means for engaging the pivotal catch through said latch opening, and means for swinging the pivotal catch into substantially the plane of the folding closure panels including an upper horizontal blade located beneath the chimes of said cans with its inner edge lying along the outside of said fold line, a folding blade for swinging said latching flap outwardly with respect to said upper horizontal blade, a second folding blade for swinging said latching flap inwardly, a substantially vertical plate parallel to the direction of travel of the cans and above the path of travel of said tongue, a folding member for swinging the tongue upwardly about said vertical plate as a fulcrum so as to align said tongue with the latch opening, and a ramp sloping upwardly in the direction of travel of the cans for pushing the end of the latching flap thereby to pass the tongue through the latch opening.

*16. In a machine for applying to cans and the like arranged in rows, a wrap-around carton having side walls each terminating at an associated closure panel, one of the closure panels having a latch opening and the other including a pivotal catch for engagement with the latch opening, the combination comprising means for pushing the carton blank and cans through the machine, means for bringing the one and the other closure panels toward a position of overlapped relationship with the one closure panel inboard of the other closure panel, means for directing the pivotal catch into the latch opening with a portion of the catch engaging an edge of the opening and a pivot axis of the catch disposed between the opening and a terminal end of the other closure panel, and means for swinging the pivotal catch about the pivot axis causing the catch to bear against the opening edge as a fulcrum to automatically tighten the side walls against the contents as the catch cams or levers the closure panels into continually increasing overlapped relationship until the closure panels are in their fully overlapped position.*

*17. A machine in accordance with claim 16 wherein said directing means is defined by a stationary blade portion.*

*18. A machine in accordance with claim 16 wherein said first-mentioned means are guides between which is disposed said directing means, and said directing means*

*being effective for holding the catch in a position out of the plane of the other closure panel incident to the catch being directed into the latch opening.*

*19. A machine in accordance with claim 16 wherein said swinging means is defined by a stationary blade portion.*

*20. A machine in accordance with claim 16 wherein said swinging means and said directing means are each defined by stationary blade portions.*

*21. A machine in accordance with claim 16 wherein said directing means is effective for folding the pivotal catch out of the plane of the other closure panel incident to the catch being directed into the latch opening.*

*22. A machine in accordance with claim 18 wherein said directing means is defined by a stationary blade portion.*

*23. A machine in accordance with claim 18 wherein said swinging means is defined by a stationary blade portion.*

*24. A machine in accordance with claim 21 wherein said directing means is defined by a stationary blade portion.*

*25. A machine in accordance with claim 21 wherein said swinging means is defined by a stationary blade portion.*

*26. A machine in accordance with claim 21 wherein said swinging means and said directing means are each defined by stationary blade portions.*

*27. In a machine for applying to cans and the like arranged in rows a wrap-around carton having side walls each terminating at an associated closure panel, one of the closure panels having a latch opening defined by an edge portion spaced inwardly of a terminal end of said one panel, the other of said closure panels having a pivotal catch disposed with a base thereof adjacent a transverse pivot line of said other panel and a terminal edge portion remote from said pivot line, the improvement comprising means for pushing the carton blank and cans through the machine, means for bringing the one and the other closure panels toward a position of overlapped relationship with the one closure panel inboard of the other closure panel, means for folding the pivotal catch out of the plane of the other closure panel and directing the catch into the latch opening with the base thereof contacting the opening edge portion of the latch opening with the pivot line positioned between the edge portion of the latch opening and the terminal end of the other closure panel, and means for swinging the other closure panel about the pivot line toward its original planar position relative to the catch causing the catch to bear against the latch opening edge portion as a fulcrum and draw the pivot axis toward the latch opening edge portion to automatically tighten the side walls against the contents as the closure panels are thereby cammed or lowered into fully closed overlapped position.*

*28. In a machine for applying to cans and the like arranged in rows, a wrap-around carton having side walls each terminating at an associated closure panel, one of said closure panels has a latch opening and the other of said closure panels includes a pivotal catch having a pivot axis for engagement with said latch opening, the combination comprising means for pushing the carton blank and cans through the machine, means for folding the pivotal catch panel and for engaging the pivotal catch panel through said latch opening with said pivot axis positioned between an edge portion of said latch opening and a terminal end of said one panel, and means for swinging the pivotal catch into substantially the plane of the folded closure panels causing said catch to bear against said latch opening edge portion and causing said catch to bear against said latch opening as a fulcrum and draw said pivot axis toward said latch opening edge portion to automatically tighten the side walls against the contents as the closure panels are thereby cammed or levered into fully closed overlapped position.*

*29. In a machine for applying to cans and the like arranged in rows, a wrap-around carton having side walls each terminating at an associated closure panel, one of the closure panels having a latch opening and the other including a pivotal catch for engagement with the latch opening, the combination comprising means for pushing the carton blank and cans through the machine, means for bringing the one and the other closure panels toward a position of overlapped relationship with the one closure panel inboard of the other closure panel, means for directing the pivotal catch into the latch opening with a portion of the catch engaging an edge of the opening and a pivot axis of the catch disposed between the opening and a terminal end of the other closure panel, and means for swinging the pivotal catch about the pivot axis causing the catch to bear against the opening edge and causing said catch to bear against said latch opening as a fulcrum and draw said pivot axis toward said latch opening edge portion to automatically tighten the side walls against the contents as the closure panels are thereby cammed or levered into fully closed overlapped position.*

*30. In a machine for applying to cans and the like arranged in rows, a wrap-around carton having side walls each terminating at an associated closure panel, one of the closure panels having a latch opening defined by an edge portion spaced inwardly of a terminal end of said one panel, the other of said closure panels having a pivotal catch disposed with a base thereof adjacent a transverse pivot line of said other panel and a terminal edge portion remote from said pivot line, the improvement comprising means for pushing the carton blank and cans through the machine, means for bringing the one and the other closure panels toward a position of overlapped relationship with the one closure panel inboard of the other closure panel, means for holding the pivotal catch out of the plane of the other closure panel and directing the latch opening with the base thereof contacting the opening edge portion of the latch opening with the pivot line positioned between the edge portion of the latch opening and the terminal end of the other closure panel, and means for swinging the other closure panel about the pivot line toward its original planar position relative to the catch causing the catch to bear against the latch opening edge portion and causing said catch to bear against said latch opening as a fulcrum and draw said pivot axis toward said latch opening edge portion to automatically tighten the side walls against the contents as the closure panels are thereby cammed or levered into fully closed overlapped position.*

*31. In a machine for applying to cans and the like arranged in rows, a wrap-around carton having side walls each terminating at an associated closure panel, one of said closure panels has a latch opening and the other of said closure panels includes a pivotal catch having oppositely directed primary and secondary latching members for engagement with said latch opening, the combination comprising means for pushing the carton blank and cans through the machine, means for folding the pivotal catch panel for engaging the primary and secondary latching members through said latch opening, and means for substantially simultaneously seating the primary and secondary latching members into overlying relationship with said one closure panel and causing said catch to bear against said latch opening as a fulcrum and draw said pivot axis toward said latch opening edge portion to automatically tighten the side walls against the contents as the closure panels are thereby cammed or levered into fully closed overlapped position.*

*32. A machine in accordance with claim 31 wherein said seating means is a ramp positioned for engagement by said pivotal catch panel during the movement of said carton along a predetermined path, and said ramp is inclined in converging relationship with said closure panels in the direction of movement of said carton along said predetermined path.*

*33. A machine in accordance with claim 32 wherein said secondary latching member is joined along a fold line in said pivotal catch panel, and said ramp is disposed in alignment for contacting the fold line to thereby progressively seat said primary and secondary latching members in the latched positions thereof.*

References Cited

The following references, cited by the Examiner, are of record in the patented file of this patent or the original patent.

UNITED STATES PATENTS

| | | | |
|---|---|---|---|
| 995,965 | 6/1911 | Heybach. | |
| 1,055,680 | 3/1913 | Stacy | 93—1.1 |
| 1,624,257 | 4/1927 | Lane. | |
| 1,664,289 | 3/1928 | Feathers | 93—1.1 |
| 2,060,240 | 11/1936 | Pergande. | |
| 2,305,130 | 12/1942 | Banta. | |

| | | | |
|---|---|---|---|
| 2,625,778 | 1/1953 | Wood. | |
| 2,751,730 | 6/1956 | Gentry. | |
| 2,780,900 | 2/1957 | Monroe. | |
| 2,809,484 | 10/1957 | Gentry. | |
| 2,809,486 | 10/1957 | Gentry. | |

FOREIGN PATENTS

| | | | |
|---|---|---|---|
| 2,817,197 | 12/1957 | Anness. | |
| 2,823,501 | 2/1958 | Tobey. | |
| 2,860,461 | 11/1958 | Arneson. | |
| 2,931,152 | 4/1960 | Arneson. | |
| 2,953,879 | 9/1960 | Murray. | |
| 2,979,876 | 4/1961 | Galloway | 53—48 |

WAYNE A. MORSE, Jr., Primary Examiner

U.S. Cl. X.R.

93—1.1